United States Patent
Rosenberg et al.

(10) Patent No.: US 11,629,687 B2
(45) Date of Patent: Apr. 18, 2023

(54) WAVE ENERGY CONVERSION OF HORIZONTAL SURGE MOTION

(71) Applicant: Oscilla Power, Inc., Seattle, WA (US)

(72) Inventors: Brian Rosenberg, Seattle, WA (US); Timothy Mundon, Seattle, WA (US)

( * ) Notice: Subject to any disclaimer, the term of this patent is extended or adjusted under 35 U.S.C. 154(b) by 0 days.

(21) Appl. No.: 17/319,277

(22) Filed: May 13, 2021

(65) Prior Publication Data

US 2021/0262430 A1  Aug. 26, 2021

Related U.S. Application Data

(63) Continuation of application No. 15/965,795, filed on Apr. 27, 2018, now Pat. No. 11,028,818.

(51) Int. Cl.
  *F03B 13/18* (2006.01)
  *B63B 22/18* (2006.01)

(52) U.S. Cl.
  CPC .............. *F03B 13/18* (2013.01); *B63B 22/18* (2013.01)

(58) Field of Classification Search
  CPC .. F03B 13/18; F03B 13/1885; F05B 2240/93; Y02E 10/30
  See application file for complete search history.

(56) References Cited

U.S. PATENT DOCUMENTS

| | | | |
|---|---|---|---|
| 10,190,568 B2 | 1/2019 | Gregory | |
| 10,590,905 B2 | 3/2020 | Sung et al. | |
| 2007/0257491 A1 | 11/2007 | Kornbluh et al. | |
| 2011/0012358 A1* | 1/2011 | Brewster | F03B 13/20 310/11 |
| 2011/0018275 A1 | 1/2011 | Sidenmark | |
| 2013/0313832 A1* | 11/2013 | Peckolt | F03B 13/16 290/54 |
| 2013/0341927 A1 | 12/2013 | Murphree | |
| 2016/0003214 A1* | 1/2016 | Mundon | E02B 9/08 405/76 |
| 2017/0002789 A1 | 1/2017 | Nair et al. | |
| 2017/0009732 A1 | 1/2017 | Mundon et al. | |
| 2017/0226984 A1 | 8/2017 | Gregory | |

OTHER PUBLICATIONS

Non-Final Office Action for U.S. Appl. No. 15/965,795, dated Apr. 28, 2020, 11 pages.
Final Office Action for U.S. Appl. No. 15/965,795, dated Nov. 17, 2020, 17 pages.

* cited by examiner

*Primary Examiner* — Jesse S Bogue
(74) *Attorney, Agent, or Firm* — Intellectual Strategies

(57) ABSTRACT

A system converts mechanical wave energy into electrical energy. The system includes a wave energy converter (WEC), which includes a surface float, a reaction structure, a plurality of flexible tethers, and a plurality of drivetrains. Each flexible tether connects the surface float to the reaction structure. Each drivetrain is connected to a corresponding flexible tether. Each flexible tether has a length established to treat the system as an inverse pendulum to utilize a horizontal surge motion of the surface float to present tension at the corresponding drivetrain for production of electrical energy from the horizontal surge motion.

10 Claims, 2 Drawing Sheets

WAVE ENERGY CONVERSION OF HORIZONTAL SURGE MOTION

This application claims the benefit of U.S. Provisional Application No. 62/491,129, filed on Apr. 27, 2017, which is incorporated by reference herein in its entirety.

Embodiments of a system are described. In one embodiment, the system converts mechanical wave energy into electrical energy. The system includes a wave energy converter (WEC), which includes a surface float, a reaction structure, a plurality of flexible tethers, and a plurality of drivetrains. Each flexible tether connects the surface float to the reaction structure. Each drivetrain is connected to a corresponding flexible tether. Each flexible tether has a length established to treat the system as an inverse pendulum to utilize a horizontal surge motion of the surface float to present tension at the corresponding drivetrain for production of electrical energy from the horizontal surge motion.

Other aspects and advantages of embodiments of the present invention will become apparent from the following detailed description, taken in conjunction with the accompanying drawings, illustrated by way of example of the principles of the invention.

Throughout the description, similar reference numbers may be used to identify similar elements.

Figure 1:
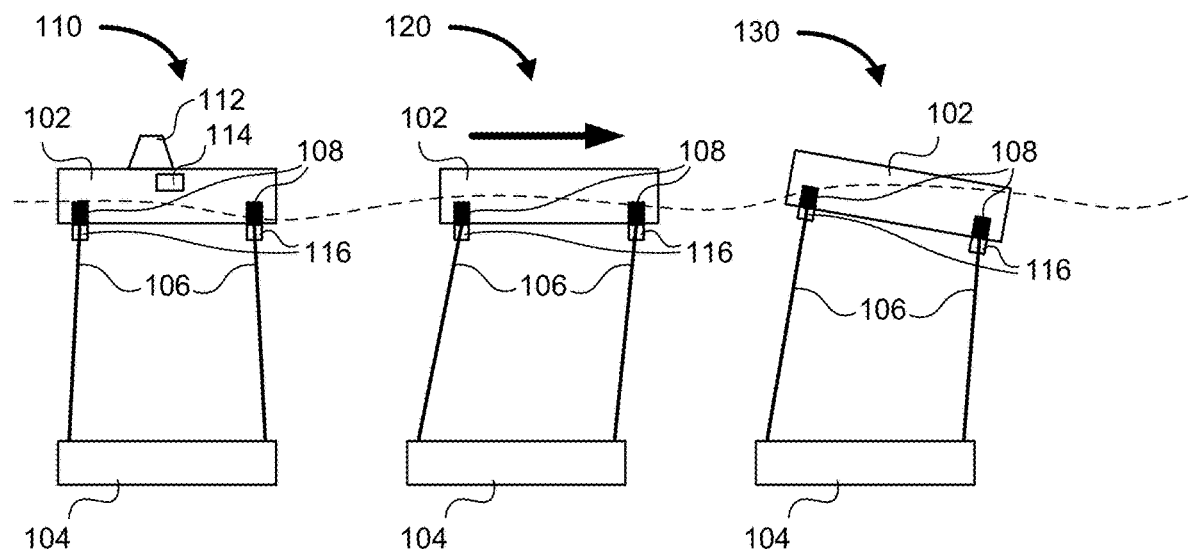
FIG. 1 depicts a schematic diagram of embodiments of a two-body system subject to surge and pitch motion of waves.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments described herein relate to an apparatus, system, and method to enhance power capture from the horizontal (surge) motion of ocean waves for wave energy converters (WECs). These embodiments can potentially deliver increased power capture at any wave period. Additionally, some embodiments can be tuned to optimize power capture at a known sea state. Additionally, some embodiments may be implemented for little to no additional cost to, or potentially even reduce the cost of, a wave energy device.

While many embodiments are described herein, certain embodiments pertain to WEC architectures having a floating body 102 that is connected to either the sea-floor 162 (or sea-floor mounted structure 164), one submerged reaction body 104, or multiple submerged reaction bodies 104 via one or more interbody flexible tethers 106.

FIG. 1 depicts a schematic diagram of embodiments 110, 120, and 130 of a two-body system subject to surge and pitch motion of waves. The illustrated embodiment 110 is an example of a two-body, flexibly-connected WEC, which may be subject to external forces of ocean waves. With the passage and impact of waves, the floating body 102 surges back and forth at the wave period as in the embodiment 120. In some embodiments, the reaction body 104, if one is used, is deployed far enough below the water surface (shown by the dotted line) that wave forces do not move it significantly, and it has a strong resistance to surge motion through its high inertia (structural mass and virtual mass) and/or high hydrodynamic drag (related to its vertical cross-sectional area). In the case of a sea-floor connected floating body (refer to FIGS. 3A and 3B), the sea-floor 162, as in the embodiment 170 shown in FIG. 3B (or sea-floor mounted structure 164 as in the embodiment 160 shown in FIG. 3A) would act as the reaction body, or equivalent, and effectively have infinite resistance to motion in the surge direction.

As the float body 102 surges horizontally with the waves, the reaction body 104 moves very little or not at all in the horizontal direction. This motion of this system can be conceptually envisaged as a pendulum (or an inverted pendulum), where the pivot point is the reaction body 104 or connection to the ocean floor 162. The natural period of a pendulum, Tn, is approximately given by the formula:

$$T_n \approx 2\pi\sqrt{\frac{L}{g}}$$

where L is the length of the pendulum tether (106 alone or combined with 172), and g is the gravitational acceleration. The true natural period of a pendulum system may deviate slightly from this relation if the oscillation amplitude is large or if the moment of inertia and/or hydrodynamic properties of the floating body 102 affect the dynamics.

While many embodiments may be implemented, two embodiments are described in detail herein. In one embodiment, the natural period of the inverted pendulum motion is tuned, through physical characteristics of the system components, to the period corresponding to the ocean waves of interest. This allows the WEC to be in resonance with the applicable wave motion and, therefore, absorbs the maximum amount of surge mechanical energy from the wave environment.

A primary parameter involved in the matching these time scales and motion cycles is the length of the interconnecting tethers 106. As an example, based on the equation above, the interconnecting tethers 106 should be approximately 56 m in length for the WEC to be tuned to waves that have a 15 second period. This type of tuning can be done as follows: (1) based on an expected sea-state based on sea-state predictions or real-time measurements, and/or (2) based on real-time sea-states at or near the location of the float 102 as determined by sensors/detectors (112) such as autonomous float-based weather/wave monitoring systems. Commands to raise and lower the heave plate 104 may be done either (1) automatically through a control system 114 that results in the heave plate 104 being raised or lowered using the on-board winches 116 based on either predicted or real-time wave conditions or (2) manually through remote command by an operator who determines the desired tether length based on the predicted or real-time sea-sate and sends a command that drives the on-board winches 116 to adjust the tether length to the desired value.

In another embodiment, the surge motion of the surface float 102 couples into different modes of motion, particularly heave and pitch, which are more amenable to power extraction for a flexibly-connected system. As the floating body 102 surges, the tethers 106 exert a horizontal force on the reaction body 104. The reaction body's movement, however, is resisted by its large inertia and/or large surge drag. The relative surge motion between the two bodies 102 and 104 generates tension in the interconnecting tethers 106. The vertical component of the tension force then causes the surface float 102 to heave below the water surface, and energy may be extracted from the wave environment due to the restoring buoyant force on the floating body 102 and the corresponding reaction against the reacting body 104. Furthermore, due to the angle that the interconnecting tethers 106 make during surge motion, the front and rear tension forces have different effective moment arms about the floating body 102 center of gravity, which results in a net pitch moment (as shown in the embodiment 130). Energy is then extracted from the wave environment due to the restoring buoyancy moment on the floating body 102 and the corresponding reaction against the reacting body 104. In order to extract energy from pitch motion, there are at least two tethers 106 for each interbody connection with some degree of separation in the surge direction, whereas for heave energy extraction, as little as one interconnecting tether 106 is necessary.

Some embodiments may employ a fixed tether length that allows optimal power capture for the average wave climate at a specific deployment location. Some embodiments of this invention may employ onboard winches 116, housed inside/outside the surface float 102 or outside/inside the reaction body 104, that raise or lower the reaction body 104 to a desired depth. This allows the device to actively change its absorption band based on shorter-term wave conditions.

In some embodiments, a system may comprise multiple reaction bodies 104 (as shown in the embodiment 190 of FIG. 3D) suspended vertically above each other at different depths below the surface. This configuration would have multiple natural periods and can therefore absorb energy over a wider band of wave periods.

Figure 2:
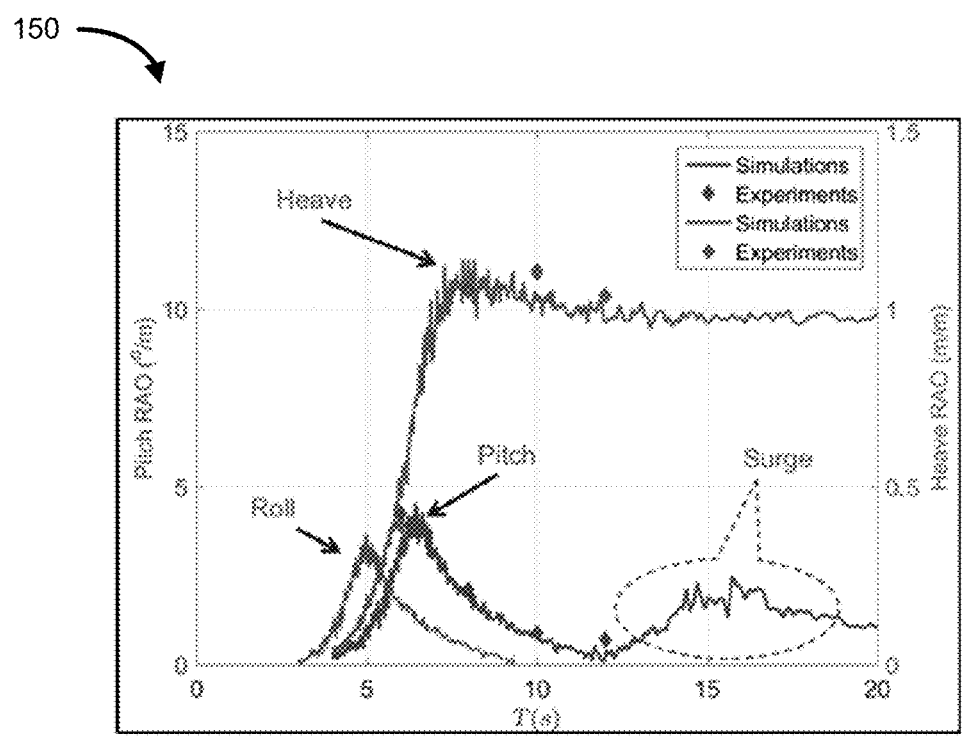
FIG. 2 depicts waveforms representative of motions experienced by a surface float for an embodiment of a multi-mode point absorber type wave energy converter.

FIG. 2 depicts waveforms representative of motions experienced by a surface float for an embodiment of a multi-mode point absorber type wave energy converter. More specifically, FIG. 2 shows one example of how a wave energy system can be designed to have high energy capture efficiency across a wide range of sea states during operation. In the illustrated embodiment, wave periods are shown on the x-axis, and the response amplitude operators (or RAOs which represent the amount of motion experienced by the device in each mode of motion) are shown on the y-axis. In this example, the natural periods (T) of oscillation for various modes of motion are spread out over the range of periods experienced in the ocean. In short period waves, roll (natural period~5 s) and pitch (natural period~7 s) are dominant. In intermediate period waves, heave (natural period~8-9 s) dominates. And at very long period waves, surge (natural period~13-17 s) starts to contribute significantly.

Table 1 shows the natural periods in surge for various tether lengths.

TABLE 1

| Tendon Length (m) | Surge Natural Period (s) |
| --- | --- |
| 10 | 6.3 |
| 20 | 9.0 |
| 30 | 11.0 |
| 40 | 12.7 |
| 50 | 14.2 |
| 60 | 15.5 |
| 70 | 16.8 |
| 80 | 17.9 |
| 90 | 19.0 |
| 100 | 20.1 |
| 110 | 21.0 |
| 120 | 22.0 |
| 130 | 22.9 |
| 140 | 23.7 |
| 150 | 24.6 |

Figure 3A:
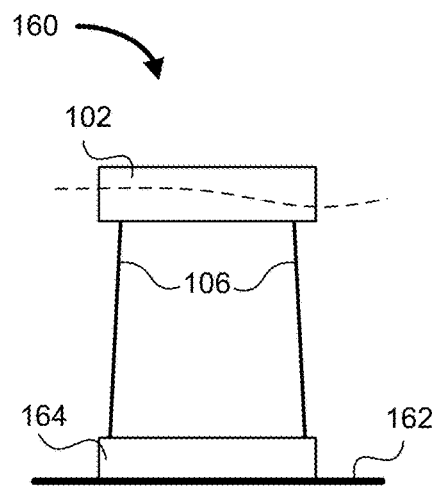
FIGS. 3A-3E depict schematic diagrams of various embodiments of a two-body system wave energy converter.
Figure 3B:
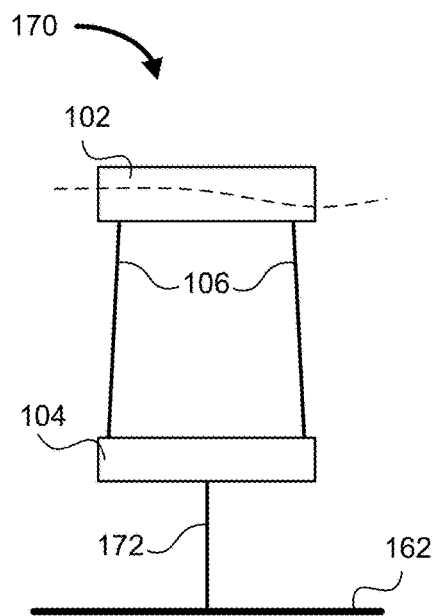
Figure 3C:
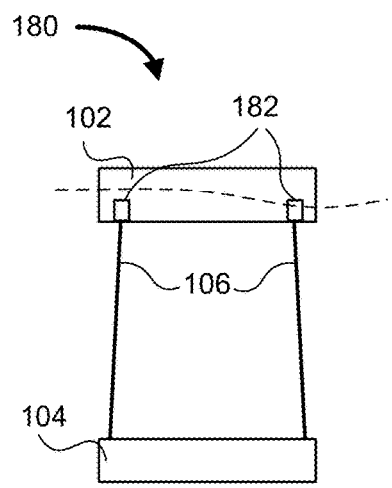
Figure 3D:
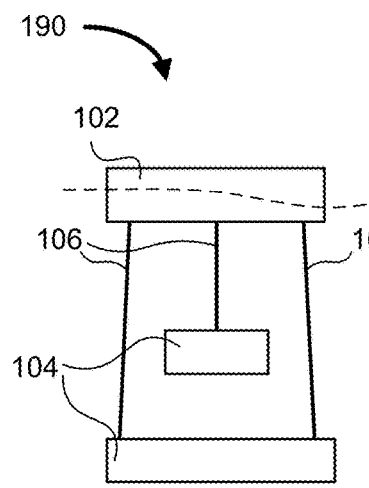
Figure 3E:
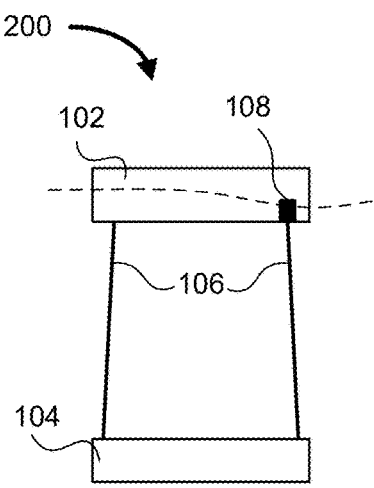

FIGS. 3A-3E depict schematic diagrams of various embodiments 160, 170, 180, 190, and 120 of a two-body system wave energy converter. FIG. 3A depicts an embodiment 160 where the reaction structure 164 rests on or is attached to the sea floor 162. FIG. 3B depicts an embodiment 170 where the reaction structure 104 is suspended above the sea floor 162 by one or more tethers 172 separate from the plurality of flexible tethers 106. FIG. 3C depicts an embodiment 180 which includes tether controllers 182 to change the length of at least one of the flexible tethers 106 and, therefore, the period of oscillation in surge motion, based on a real or expected sea state that the system is operating in. FIG. 3D depicts an embodiment 190 having more than one body 104 suspended from the surface float 102 using the flexible tethers 106 at different depths below the surface. FIG. 3E depicts an embodiment 200 where the drivetrain 108 is located within the surface float 102.

In further embodiments, the system may include onboard diagnostics and/or controllers to evaluate forces and movement affecting the system, and optionally modifying physical characteristics such as tether lengths to optimize or influence the motion and energy conversion of the system.

Other embodiments may incorporate one or more other aspects from related descriptions, including the subject matter described and shown in any of the following U.S. patents and/or patent applications:

Ser. No. 13/928,035, filed on Jun. 26, 2013
Ser. No. 14/186,577, filed on Feb. 21, 2014
Ser. No. 14/808,436, filed on Jul. 24, 2015
Ser. No. 14/855,134, filed on Sep. 15, 2015
Ser. No. 15/217,772, filed on Jul. 22, 2016

The disclosure of each of these referenced patents and/or patent applications is incorporated herein in its entirety.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
operating a wave energy converter (WEC) to capture mechanical energy from ocean waves, wherein the WEC comprises:
　a surface float;
　a reaction structure;
　more than one flexible tether connecting the surface float to the reaction structure, with each flexible tether connect to a drivetrain;
deploying the WEC at a location of wave activity with pre-determined compatibility between the wave activity and lengths of the flexible tethers to facilitate an inverse pendulum motion of the surface float; and
adjusting at least one length of at least one tether connecting the drivetrain to the surface float to improve the compatibility between the wave activity and the lengths of the flexible tethers, wherein the length of the at least one tether is established to treat the system as an inverse pendulum to utilize a horizontal surge motion of the surface float to present tension at the corresponding drivetrain for production of electrical energy from the horizontal surge motion, and to follow approximately a natural pendulum given by the formula:

$$T_n \approx 2\pi \sqrt{\frac{L}{g}}$$

wherein where L is the length of a tether, and g is the gravitational acceleration, and $T_n$ is the natural period.

2. The method of claim 1, wherein the reaction structure rests on the sea floor.

3. The method of claim 1, wherein the reaction structure is suspended above the sea floor and connected to the sea floor by one or more flexible tethers other than the plurality of flexible tethers.

4. The method of claim 1, wherein a natural period of surge oscillation of the system is different than a natural period for pitch motion.

5. The method of claim 1, wherein a natural period of surge oscillation of the system is different than a natural period for heave motion.

6. The method of claim 1, wherein a natural period of surge oscillation of the system is similar to a natural period for pitch motion so as to maximize energy capture from waves in a sea-state that has an average energy period similar to these two natural periods.

7. The method of claim 1, wherein a natural period of surge oscillation of the system is similar to a natural period for heave motion so as to maximize energy capture from waves in a sea-state that has an average energy period similar to these two natural periods.

8. The method of claim 1, further comprising changing the length of at least one flexible tether of the plurality of flexible tethers, and therefore a period of oscillation in surge motion, during operation based on a real or expected sea state that the device is operating in, by using a mechanism to adjust the length of the tethers to a length that results in a natural period of oscillation in surge for that particular sea state.

9. The method of claim 1, further comprising suspending at least one additional reaction structure from the surface float using the flexible tethers at different depths below the surface.

10. The method of claim 1, where at least one drivetrain of the plurality of drivetrains is located within the surface float.

* * * * *